(12) United States Patent
Kvisteroy et al.

(10) Patent No.: US 7,692,358 B2
(45) Date of Patent: Apr. 6, 2010

(54) BACKSCATTER SENSOR

(75) Inventors: Terje Kvisteroy, Horten (NO); Reidar Holm, Horten (NO); Sverre Horntvedt, Asgardstrand (NO)

(73) Assignee: Infineon Technologies Sensonor AS, Horten (NO)

( * ) Notice: Subject to any disclaimer, the term of this patent is extended or adjusted under 35 U.S.C. 154(b) by 310 days.

(21) Appl. No.: 11/940,005

(22) Filed: Nov. 14, 2007

(65) Prior Publication Data
US 2008/0224568 A1    Sep. 18, 2008

(30) Foreign Application Priority Data
Nov. 14, 2006   (EP)   ................... 06124075

(51) Int. Cl.
*H01L 41/107* (2006.01)
(52) U.S. Cl. ...................... 310/318; 310/338
(58) Field of Classification Search ............ 310/318, 310/338
See application file for complete search history.

(56) References Cited

U.S. PATENT DOCUMENTS 6,237,417 B1   5/2001   Lonsdale et al.
6,378,360 B1   4/2002   Bartels

FOREIGN PATENT DOCUMENTS

EP    0737864 A1    10/1996
JP    60203828      10/1985

OTHER PUBLICATIONS

Bill Drafts, "Acoustic Wave Technology Sensors," Microsensor Systems Inc., Oct. 1, 2000.

*Primary Examiner*—Thomas M Dougherty
(74) *Attorney, Agent, or Firm*—Edell, Shapiro & Finnan, LLC

(57) ABSTRACT

A micro mechanical backscatter sensor includes a receiver for receiving a modulated electromagnetic signal, a capacitive element operatively connected to the receiver, the capacitive element being arranged such that a voltage is generated across the capacitor in response to the frequency of the received signal, and a resonator operatively connected to the capacitive element such that electrostatic forces that are induced by the voltage generated cause the resonator to vibrate at a resonance frequency, the resonator being arranged such that an applied external force alters the resonance frequency of vibration. The sensor further includes a demodulator for demodulating the received signal, a modulator for modulating a carrier signal of the received signal by mixing the carrier signal with the resonance frequency of the resonator to produce a modulated electromagnetic transmission signal, and a transmitter, operatively connected to the capacitive element and arranged to transmit the modulated transmission signal.

9 Claims, 4 Drawing Sheets

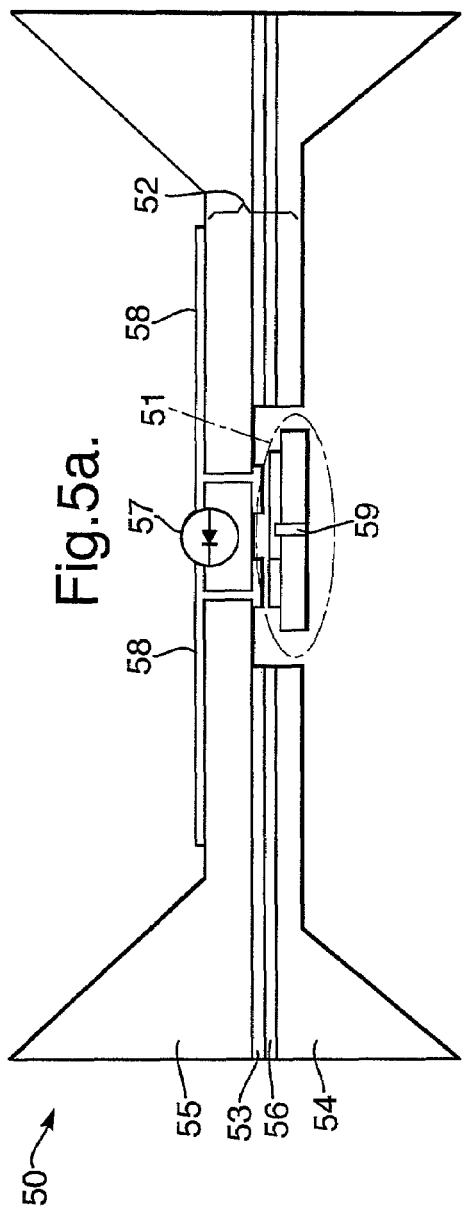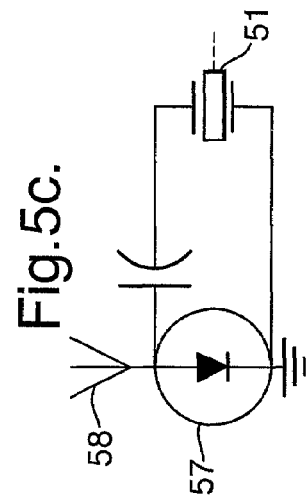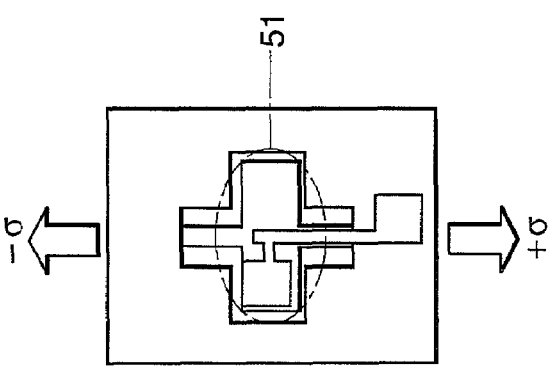

BACKSCATTER SENSOR

CROSS REFERENCE TO RELATED APPLICATIONS

This application claims priority under 35 U.S.C. §119 to Application No. EP 06124075.0 filed on Nov. 14, 2006, entitled "Backscatter Sensor," the entire contents of which are hereby incorporated by reference.

FIELD OF THE INVENTION

The device relates to a backscatter sensor. Optionally, the device relates to a backscatter sensor for use in a micro electromechanical system (MEMS) device.

BACKGROUND

Backscatter sensors are used in a wide range of technological fields, including sensor applications for sensing a range of parameters such as temperature, pressure, torque, mass, humidity, and chemical vapors. Such backscatter sensors have been realized using LC-resonator, surface acoustic wave (SAW) or bulk acoustic wave (BAW) technology. In considering factors such as cost and effectiveness, systems that use the ultra-high frequencies (UHF) in the industrial, scientific and medical (ISM) radio bands are generally of most interest. The main advantages offered by a backscatter sensor are the combined wireless and battery-less operation.

However, known devices employing the above-mentioned technologies have various associated disadvantages. Known backscatter sensing systems normally suffer from large losses owing to, for example, low Q-factor (large damping).

LC-resonators are only useful for very low frequencies (typically <1 MHz) because of a degradation in the Q-factor of such devices at higher frequencies.

In principle, a backscatter sensor can be realized as either a delay line system or a resonator circuit, and each of these methods can be realized using a method of direct perturbation (i.e., where the measurand directly influences the BAW- or SAW-element) or one of indirect perturbation (i.e., where the measurand directly influences a circuit element, such as a capacitor, which in turn is coupled in a circuit to the BAW- or SAW-element). For a delay line configuration the interrogation (or irradiation) signal is normally a pulse, while for the resonator circuit the interrogation (or irradiation) signal is normally a modulated (AM or FM) continuous wave. In practice, the SAW configuration can be used for both direct and indirect perturbation. However, the BAW configuration is generally only suitable for use with indirect perturbation. In the case of direct perturbation the sensitivity will typically be proportional to the amount of energy in the propagation (acoustic) path that is perturbed, making BAW sensors less sensitive than SAW sensors as the energy is dispersed through the bulk material, minimizing the energy density on the surface where sensing occurs.

A typical example of a BAW backscatter sensor is known to be used as a sensor in a vehicle tire that is irradiated by an antenna in the wheel arch at a carrier frequency of 2.45 GHz (maximum power of 10 mW). Initially, the signal is amplitude-modulated by a control unit in the range of 5 to 10 MHz. The sensor receives the signal and demodulates it by means of a detector diode; the modulated wave is used to stimulate oscillations in a quartz crystal resonator. The modulation is then switched off, and the carrier signal is radiated at reduced power. The quartz then vibrates at its natural resonance frequency, which varies with temperature or as it is influenced by an associated capacitive pressure sensor. These vibrations are mixed with the remaining carrier signal, which is then reflected to the antenna, this reflected signal including modulated sidebands. The control unit receives the signal and analyzes it by means of a digital receiver circuit.

A typical example of a known BAW backscatter sensor is shown in FIG. 1a. The configuration includes a varactor diode 1, a quartz resonator 2 and a capacitive sensor 3. This system is disadvantageous owing to the requirement for each of the varactor diode, quartz crystal and capacitive pressure sensor, creating unnecessarily complex circuitry. Hybrid integration is necessary, while such a sensor is relatively large, heavy and expensive to manufacture. The Q-factor of such a device is limited by the series resistance in the capacitive pressure sensor (or impedance sensor). Additionally, such a device is only operable within a limited range of frequencies.

Typical examples of a SAW backscatter sensor are also known as Acoustic Wave Technology Sensors. These are disadvantageous in that they rely on customized technology and are mechanically complex. They have a very high relative size and weight compared to other types of backscatter sensors, are expensive to manufacture and again have a limited Q-factor.

A known force sensor has a beam of silicon material that is subjected to vibration at a resonant frequency, the vibration frequency changing due to applied forces acting on the sensor.

There is therefore a need within the field of backscatter sensors to provide a simplified and inexpensive sensor that is compact and light compared to current devices, that has a less complex mechanical structure and that provides high Q-factors and that can accommodate improved detection over a wide range of frequencies.

SUMMARY

Described herein is a micro mechanical backscatter sensor. According to the present invention, the micro mechanical backscatter sensor comprises:

a receiver arranged to receive a modulated electromagnetic signal;

a capacitive element operatively connected to the receiver, the capacitive element being arranged such that a voltage is generated across the capacitor in response to the frequency of the received signal;

a resonator operatively connected to the capacitive element such that electrostatic forces that are induced by the voltage generated cause the resonator to vibrate, the resonator vibrating at a resonance frequency of vibration thereof, the resonator being arranged such that an external force applied thereto alters the resonance frequency of vibration thereof;

a demodulator configured to demodulate the received modulated signal;

a modulator configured to modulate a carrier signal of the received signal by mixing the carrier signal with the resonance frequency of the resonator to produce a modulated electromagnetic transmission signal; and a transmitter operatively connected to the capacitive element and arranged to transmit the modulated transmission signal.

The backscatter sensor of the invention is advantageous in that no piezoelectric material, magnetic material or electret material is required. The sensor can be manufactured as a single, integrated element in a MEMS device and no "hybridization" of the device is needed. The sensor of the invention is small, lightweight and inexpensive to manufacture compared with known devices, and is fully compatible with semiconductor/MEMS manufacturing technology. No additional impedance sensor (such as a capacitor) is required, and no complex mechanical arrangement or extra components are needed in order to allow the resonator to be influenced by the measurand (for example, pressure or acceleration).

MEMS structures are highly advantageous in sensing technology as they can cover a wide range of frequencies from kHz to GHz without affecting the relative size or weight of the sensor. Additionally, very high Q-factors (in the range of 500 000 in the MHz range) are possible, making the irradiation requirement lower and detection simpler with less loss than known devices.

For backscatter sensors using the "delay line" method described previously, that is, where a time or frequency dispersion is involved, modulation or demodulation of the signal is normally not needed. The interrogation signal in such a case is a pulse that contains a range of frequencies. However, for the backscatter sensor of the invention a resonator circuit, which affects the frequency domain, is the most practical realization.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Examples of the present invention will now be described in detail with reference to the accompanying drawings, in which:

FIG. 5a shows the diaphragm and resonator of the present invention;

FIG. 5b shows a planar view of the resonator of FIG. 5a; and

FIG. 5c shows an equivalent circuit of the example of FIG. 5a.

DETAILED DESCRIPTION

Figure 1A:
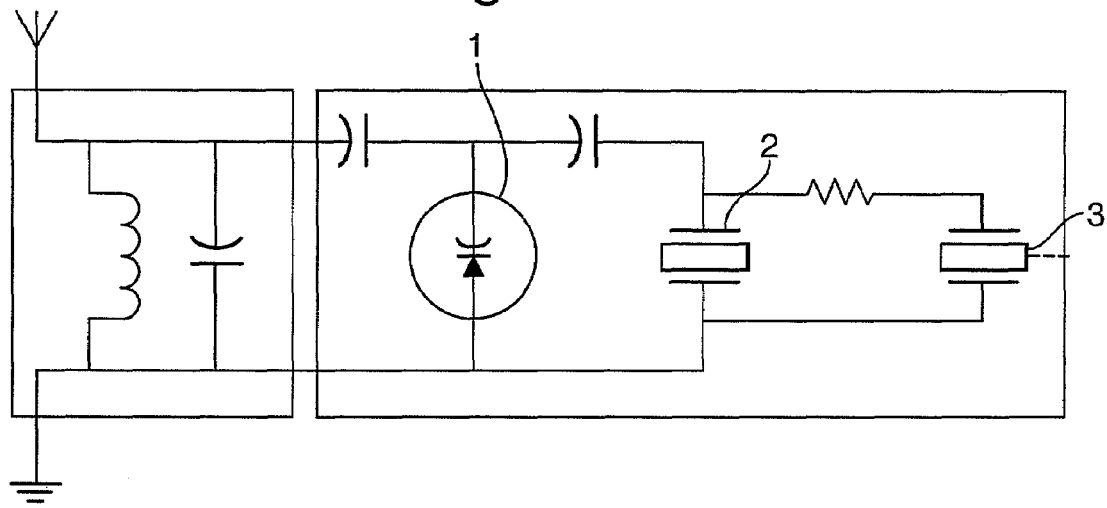
FIG. 1a shows an example of a known bulk acoustic wave (BAW) backscatter sensor.
Figure 1B:
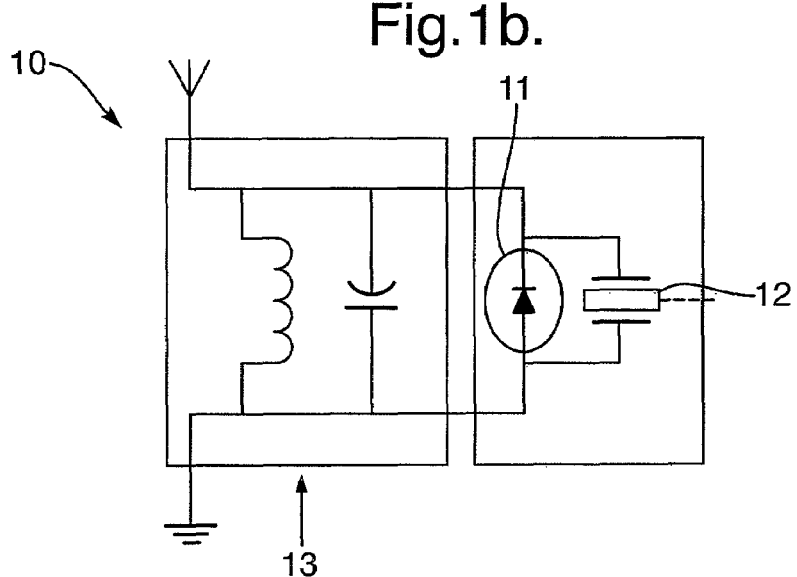
FIG. 1b shows a basic circuit of a backscatter sensor according to the invention.

Described herein is a micro mechanical backscatter sensor. FIG. 1b shows a basic circuit of a backscatter sensor 10 according to the invention, the sensor having an integrated diode 11, an intrinsically coupled stress-sensitive vibrating micro electromechanical resonator 12 (described in detail below) and a single antenna 13 that acts as a receiver and transmitter, which can be tuned according to the requirements of the associated system or intended use of the sensor 10. It can be seen that the micro mechanical resonator 12 (with integrated diode 11) of the invention replaces the varactor diode 1, BAW crystal resonator 2 and capacitive pressure sensor 3 of the prior art device of FIG. 1a, providing a more compact and less complex sensor. The backscatter sensor will be described in detail with reference to FIG. 2.

Figure 2:
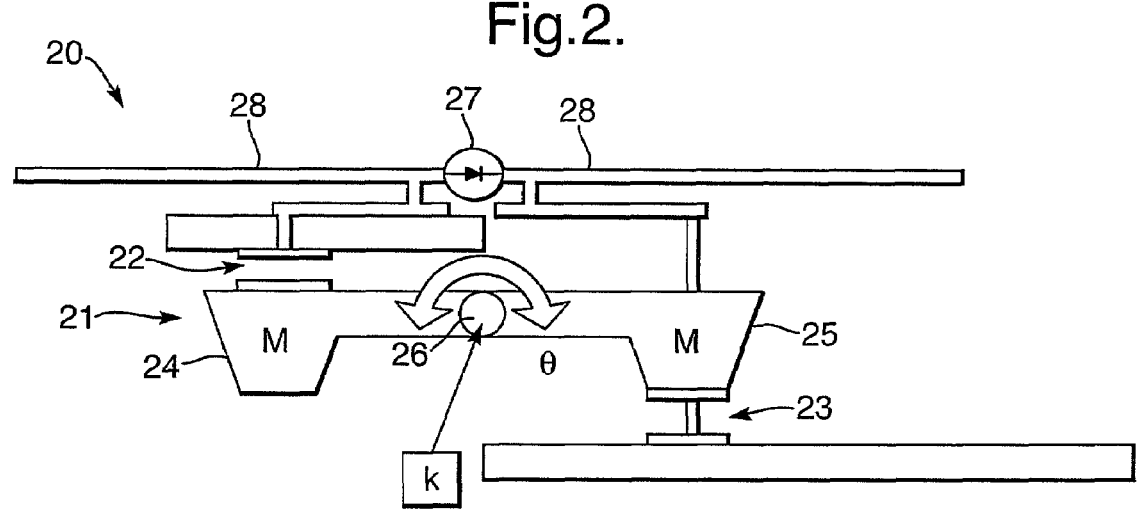
FIG. 2 shows an example of the backscatter sensor of the invention in the form of a stress-sensitive torsional micro mechanical resonator device.

FIG. 2 shows an example of a backscatter sensor 20 in the form of a stress-sensitive torsional micro mechanical resonator 21. A modulated high frequency electromagnetic RF signal is received by a sensor antenna 28, which is operatively connected to the resonator and capacitors. The received RF signal is transformed into electrostatic forces by capacitors 22 and 23. One plate of a first capacitor 22 is connected to the antenna 28 ($1^{st}$ half of dipole) and the other is connected to the resonator 21. One plate of a second capacitor 23 is connected to the resonator and the other is connected to the antenna ($2^{nd}$ half of dipole). In this way, the device is operated differentially. However, devices having a single capacitor are also possible. Masses 24 and 25 that are connected to or form an integral part of the resonator are suspended between the capacitors 22 and 23. The forces induced cause the micro resonator, which is formed of a semiconductor material, to vibrate at its resonance frequency. In general, the low damped micro resonator 21 with masses 24 and 25 of mass M, a torsional stiffness k and a polar moment of inertia I will have a resonance $\omega_0$ (in the absence of electrostatic force) of $$\omega_0 = \sqrt{k/I}.$$

The force resulting from, for example, pressure or acceleration acting on the sensor 20 must be such that it influences the stiffness k, for example by the stress induced thereby in the torsion beam 26 (which lies in a direction normal to the plane shown in FIG. 2) of the resonator 21. In theory the measurand could alternatively influence the masses 24 and 25 of the sensor 20.

The modulation present in the RF signal is then switched off and the carrier signal alone is radiated at reduced power. Owing to the high Q-factor of the device the micro resonator 21 continues to oscillate at its resonance frequency, which alters depending on the measured parameter acting on the sensor 20, as an external force or load applied to the resonator will influence the stiffness k of the resonator 21 and hence the resonance frequency of vibration thereof. These free oscillations cause the capacitances of the capacitors 22 and 23 to vary. A carrier voltage that is rectified by a diode 27, together with the variation in capacitance, results in a generated voltage signal at the resonance frequency of the micro resonator 21. This signal will mix with the carrier signal (through the diode), creating a high frequency electromagnetic RF modulated signal that is backscattered (that is, reflected) from the sensor 20.

The RF-communication requires that the baseband (information) signal is shifted to a frequency or frequencies suitable for electromagnetic transmission to the sensor 20. At the sensor 20, the reverse process, shifting the received RF signal back to baseband, allows the recovery of the information. This frequency-shifting function is traditionally known as "mixing". Any device that exhibits non-linear behavior (for example, diodes, varactors or transistors) can serve as a mixer; as non-linear distortion results in the production (from the signals present at the input of a device) of signals at new frequencies at multiples of the original frequencies as well as at all sums and subtractions between frequency components in the original information.

The stimulation for the MEMS micro resonator 21 relies on the conversion of electromagnetic irradiation to mechanical forces by the irradiation voltage V (modulated) on the capacitors 22 and 23. This creates a non-linear electrostatic force F of the form $$F = \varepsilon A V^2 / d^2$$

(where A is the area of the capacitor electrodes and d is the distance between the capacitor electrodes).

It is not essential for the electrostatic driven device to include the additional non-linear device (for example, the diode 27) to cause oscillations, as non-linearities in the device can compensate for the provision of the diode 27 during demodulation. However, in the example shown both the diode 27 and the voltage-to-force conversion will take part in the mixing (demodulation) of the carrier signal (for example modulated by the assumed (nominal) resonance frequency).

The free oscillations of the MEMS micro resonator 21 cause the capacitance(s) to vary, which in turn, in combination with the rectified (by the diode 27) carrier DC voltage (acting as a DC bias voltage) results in a generated voltage signal at the resonance frequency of the resonator 21.

The diode 27 therefore acts as a mixer and combines the oscillation frequency (generated at the resonance or free oscillation frequency) with the carrier frequency (which at this point is at reduced power). This mixed or modulated signal is then transmitted (and hence backscattered) by the sensor antenna 28.

Figure 3:
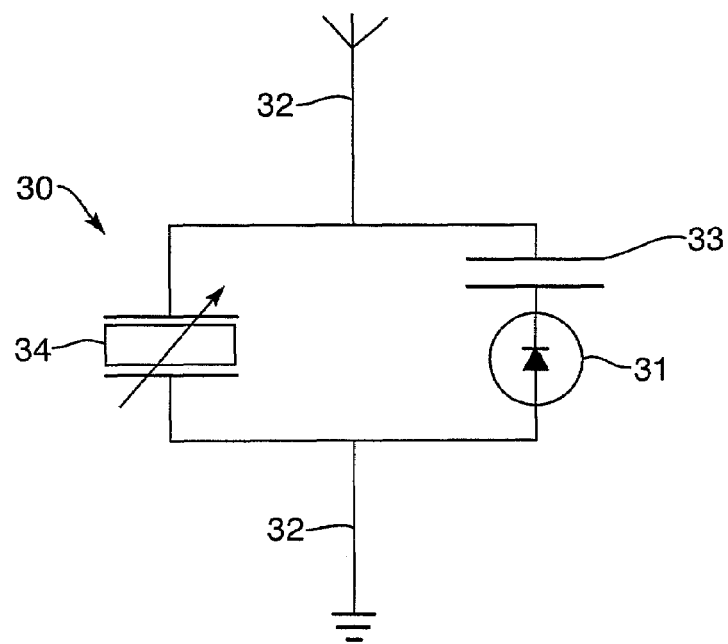
FIG. 3 is an electrical diagram of an example of the backscatter sensor of the invention.

FIG. 3 is an electrical diagram to further explain the concept of a MEMS micro resonator 30. A diode 31 is simply created in the semiconductor material used for micromachining the MEMS micro resonator 30, for example, by the creation of a p-n junction in the surface of the sensor. The diode 31 clips a carrier signal received at an antenna 32 and creates a DC component across the resonator 30, thus rectifying the signal. The antenna 32 is a single transmitting and receiving device that is operatively connected to each side of the resonator and a capacitor 34. In this case a single capacitor is present, while in the example of FIG. 2 two capacitors are present (to allow differential operation). An optional capacitor 33, enabling voltage division, is also shown. Oscillations in the resonator at its resonance frequency cause the capacitances thereof to vary at the same frequency, which in combination with the rectified carrier voltage results in a generated voltage signal of the same frequency.

In the examples of FIGS. 2 and 3, a single antenna can be used as the receiver and transmitter; in this way, the antenna can receive the carrier wave signal (which is rectified to provide a DC bias) at the same time as the modulated signal is present at the antenna for transmission. The antenna circuit tuning elements are not shown in the illustrated examples, and these elements can be omitted from a device incorporating the sensor depending on the practical implementation of the device and the allowed attenuation of both the received and transmitted signals. However, in the interest of efficiency, some form of antenna tuning may be required. In some cases the antenna tuning can be implemented by the use of parasitic capacitances and, for example, wire bonds according to the required inductance.

Figure 4A:
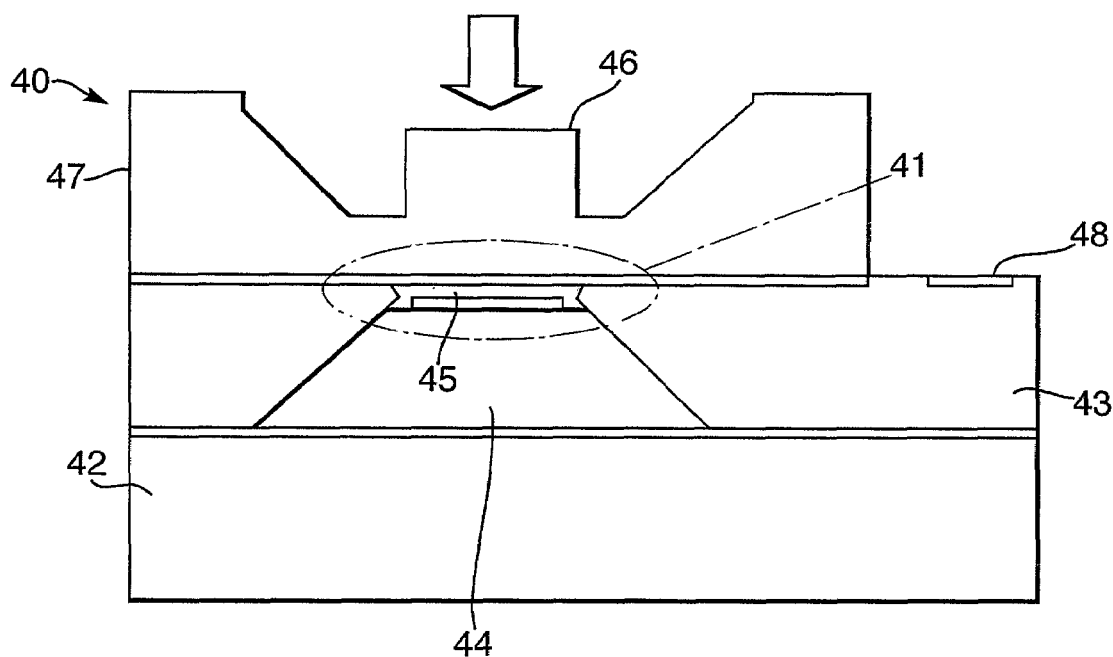
FIGS. 4a and 4b show examples of backscatter sensors according to the invention in which acceleration and pressure are sensed, respectively.
Figure 4B:
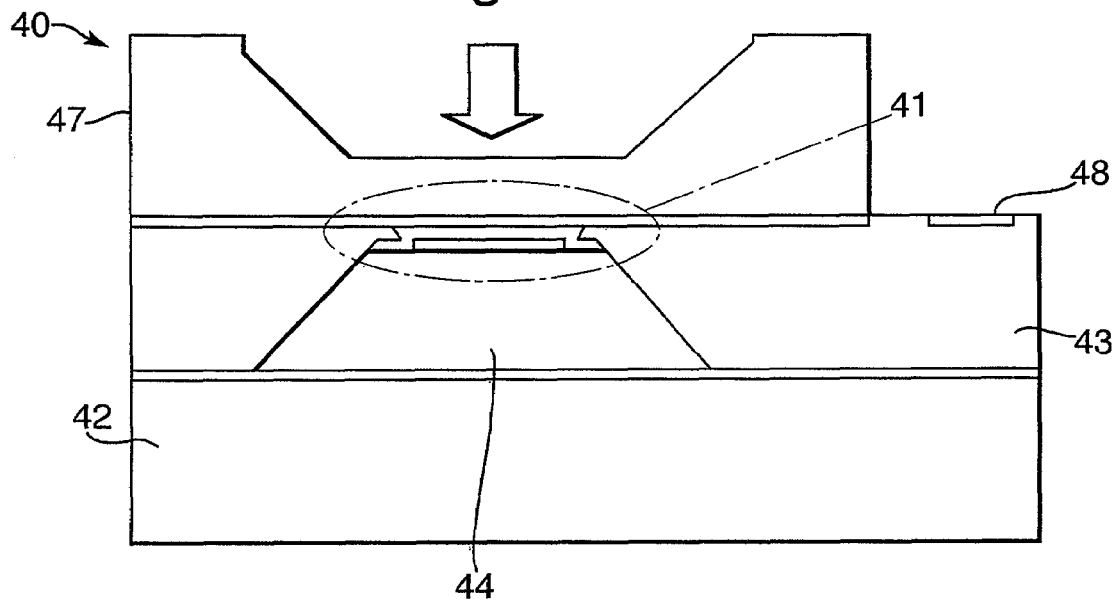

FIGS. 4a and 4b show examples of the MEMS resonator structure of a MEMS resonator backscatter sensor.

The backscatter sensor 40 of FIG. 4a is a layered semiconductor device comprising an intrinsically coupled stress-sensitive vibrating MEMS resonator 41. The device comprises a glass substrate 42 to which a first structure of semiconductor material 43, such as silicon, is bonded, typically by wafer-bonding. The positioning of the first structure on the glass substrate is such that a cavity 44 is created, and a vacuum is created in the cavity 44 using known techniques. The sensor 40 comprises a diaphragm 45 that is influenced by a mass 46 that optionally forms an integral part of a second structure 47 of semiconductor material that is wafer-bonded to the first. The sensor 40 is suitable for sensing parameters such as acceleration acting on the mass 46. The device has bonding pads 48 to allow connection to an antenna (not shown) that receives and transmits the RF signal.

FIG. 4b shows a similar device to that of FIG. 4a, however in this case no additional mass 46 is required as part of the second semiconductor structure 47, the stress-sensitive vibrating resonator 41 again being arranged to vibrate upon the application of a force or load in order to determine a parameter such as pressure acting on the diaphragm.

An example of a MEMS resonator 51 and a diaphragm 52 of a backscatter sensor 50 is shown in FIG. 5a. The diaphragm 52 is created by known etching micro machining techniques. An oxide isolation layer 53 is created and first and second semiconductor (e.g., silicon) structures 54 and 55 are bonded (56) together. A diode 57 is provided in the surface of the sensor 50 and an antenna 58, such as a dipole or loop antenna, is also provided. The stress-sensitive vibrating resonator 51 is excited on a single side thereof and vibrates at its resonance frequency; pressure applied to the sensor 50 results in a bending stress, σ (FIG. 5b), which in turn changes the stiffness, k, in the torsion beam 59 of the sensor 50. The resonance frequency of the resonator 51 will therefore change, and the subsequent transmission of a modulated signal that is affected by this change in resonance frequency can then be compared to the original interrogation signal and the desired parameter (that is, pressure, acceleration, etc.) can be determined. An equivalent circuit, shown in FIG. 5c, shows the antenna 58, diode 57, fixed capacitor and resonator 51 of the backscatter sensor.

In summary, the provision of a MEMS resonator provides a highly advantageous backscatter sensor that is less complex, more compact, lightweight and inexpensive, and that improves detection over a wide range of frequencies, in comparison to known backscatter sensors.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A micro mechanical backscatter sensor comprising:
   a receiver configured to receive a modulated electromagnetic signal;
   a capacitive element operatively connected to the receiver, the capacitive element being arranged such that a voltage is generated across the capacitor in response to the frequency of the received signal;
   a resonator operatively connected to the capacitive element such that electrostatic forces that are induced by the voltage generated cause the resonator to vibrate, the resonator vibrating at a resonance frequency of vibration thereof, the resonator being configured such that an external force applied thereto alters the resonance frequency of vibration thereof;
   a demodulator configured to demodulate the received modulated signal;

a modulator configured to modulate a carrier signal of the received signal by mixing the carrier signal with the resonance frequency of the resonator to produce a modulated electromagnetic transmission signal; and a transmitter operatively connected to the capacitive element and configured to transmit the modulated transmission signal.

2. The backscatter sensor according to claim 1, further comprising:

a second capacitive element operatively connected to each of: the receiver, the transmitter and the resonator.

3. The backscatter sensor according to claim 1, wherein the receiver and the transmitter together comprise a single antenna configured to receive and transmit signals.

4. The backscatter sensor according to claim 1, wherein the resonator comprises a semiconductor material.

5. The backscatter sensor according to claim 1, wherein at least one of the demodulator and the modulator is a diode.

6. The backscatter sensor according to claim 5, wherein the diode comprises a p-n junction.

7. The backscatter sensor according to claim 1, wherein the resonator comprises at least one mass configured to vibrate with the resonator.

8. The backscatter sensor according to claim 1, further comprising:

a semiconductor structure; and a substrate bonded to the semiconductor structure such that a cavity is defined therebetween, wherein the resonator is situated within the cavity.

9. The backscatter sensor according to claim 8, wherein the cavity comprises a vacuum.

* * * * *